United States Patent [19]

Ghaem et al.

[11] Patent Number: 5,371,598

[45] Date of Patent: Dec. 6, 1994

[54] OPTICAL DISPLACEMENT SENSOR AND METHOD FOR SENSING LINEAR DISPLACEMENTS IN A SHOCK ABSORBER

[75] Inventors: Sanjar Ghaem, Palatine; Kenneth S. Gerbetz, Arlington Heights; Jie Xue, Wheeling, all of Ill.

[73] Assignee: Motorola, Inc., Schaumburg, Ill.

[21] Appl. No.: 132,982

[22] Filed: Oct. 7, 1993

[51] Int. Cl.⁵ .......................................... G01B 11/00
[52] U.S. Cl. ................................. 356/373; 250/231.1
[58] Field of Search ...................... 356/373, 374, 375; 250/222.1, 231.1; 33/707

[56] References Cited

U.S. PATENT DOCUMENTS

| | | |
|---|---|---|
| 4,107,604 | 8/1978 | Bernier . |
| 4,291,976 | 9/1981 | McMahon . |
| 4,310,172 | 1/1982 | Claude et al. . |
| 4,356,395 | 10/1982 | Miller . |
| 4,362,358 | 12/1982 | Hafle . |
| 4,376,387 | 3/1983 | Stevens et al. . |
| 4,384,038 | 5/1983 | Khoe et al. . |
| 4,453,725 | 6/1984 | Kuwana et al. . |
| 4,477,190 | 10/1984 | Liston et al. . |
| 4,555,120 | 11/1985 | Frait et al. . |
| 4,596,320 | 6/1986 | Shimokura et al. . |
| 4,604,725 | 8/1986 | Davies et al. . |
| 4,836,578 | 6/1989 | Soltis . |
| 4,867,475 | 9/1989 | Groves . |
| 4,890,858 | 1/1990 | Blankenship . |
| 4,897,671 | 1/1990 | Mahapatra et al. . |
| 4,902,903 | 2/1990 | Segerson et al. . |
| 4,953,933 | 9/1990 | Asmar . |
| 4,991,509 | 2/1991 | Smith . |
| 5,047,629 | 9/1991 | Geist . |
| 5,064,031 | 11/1991 | Kakizaki . |

FOREIGN PATENT DOCUMENTS

| | | | |
|---|---|---|---|
| 111003 | 6/1984 | Japan | 356/373 |
| 233305 | 9/1988 | Japan | 356/373 |

*Primary Examiner*—F. L. Evans
*Attorney, Agent, or Firm*—Phillip H. Melamed

[57] ABSTRACT

A device and method for sensing linear displacements between a first member (101) and a second member (102) on a same axis (108). The second member (102) substantially encompasses the first member (101). To sense the linear displacements, an optical code pattern (103) is placed on the first member (101) and an encircling optical sensor (104) is placed on the second member (102). The encircling optical sensor (104) includes light transmitting (106) and receiving (107) paths that transmit and receive light to/from the optical code pattern (103). The light received from the optical code pattern (103) is sent to a displacement calculation device (105) that determines the linear displacement of the first member (101) with respect to the second member (102). Using this technique, linear displacements of the first member (101) with respect to the second member (102) can be accurately measured in high temperature environments without adversely affecting electrical components associated with the displacement calculation device (105).

16 Claims, 5 Drawing Sheets

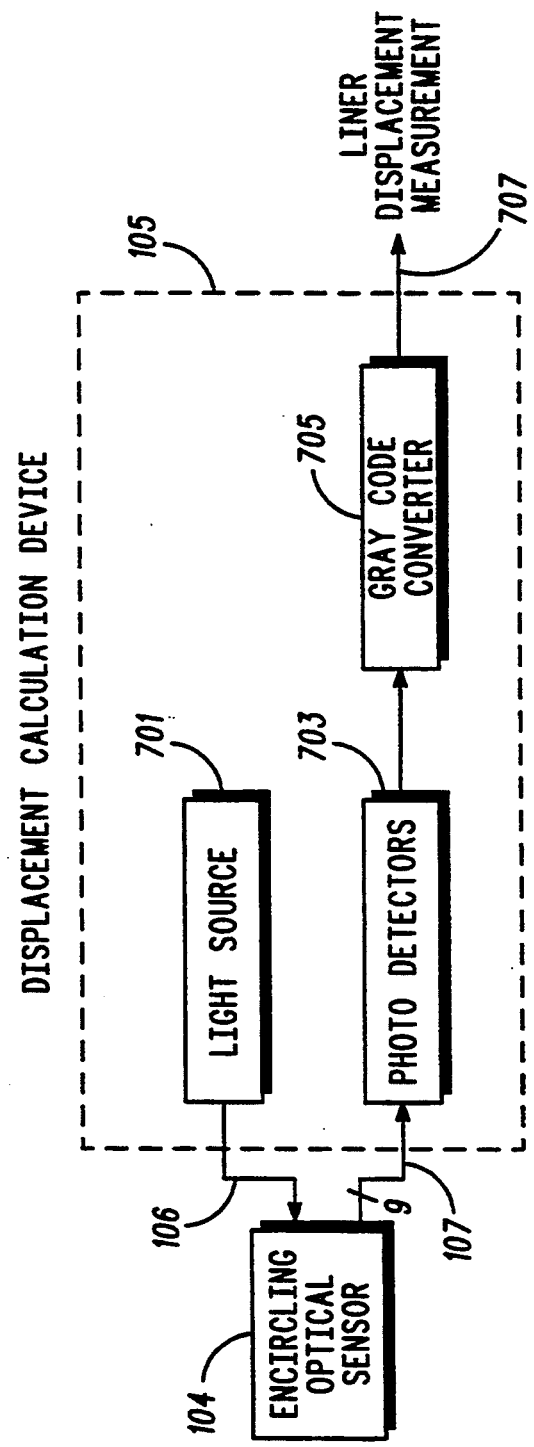

OPTICAL DISPLACEMENT SENSOR AND METHOD FOR SENSING LINEAR DISPLACEMENTS IN A SHOCK ABSORBER

FIELD OF THE INVENTION

This invention is generally directed to the field of absolute position displacement sensors, and specifically for measurement of height of a shock absorber in a vehicular suspension system.

BACKGROUND OF THE INVENTION

Contemporary position displacement sensors for vehicular shock absorbers include those based on Hall-effect switches, and various forms of optical sensors. Hall-effect switches provide low accuracy, must be mounted outside of a shock absorber, and don't work in the presence of water.

The various forms of optical sensors including proximity type, and the coaxial reflective type will not reliably operate at the extreme temperatures found inside a shock absorber, which may exceed 160° Celsius.

What is needed is an improved sensor for measuring a displacement of a shock absorber that is accurate and will work reliably under extreme temperature conditions.

BRIEF DESCRIPTION OF THE DRAWINGS

FIG. 7 is a system block diagram illustrating details of the encircling optical sensor and a displacement calculation device.

DETAILED DESCRIPTION OF A PREFERRED EMBODIMENT

Generally, the present invention provides a method and apparatus for sensing linear displacements between a first member and a second member. In a preferred embodiment, the second member and the first member reside on the same axis, where the second member substantially encompasses the first member. To sense the linear displacements, an optical code pattern is placed on the first member and an encircling optical sensor is placed on the second member. The encircling optical sensor includes light transmitting and receiving paths that transmit and receive light to/from the optical code pattern. The light received from the optical code pattern is sent to a displacement calculation device that determines the linear displacement of the first member with respect to the second member. Using this technique, linear displacements of the first member with respect to the second member can be accurately measured in high temperature and pressure environments without adversely affecting electrical components.

Figure 1:
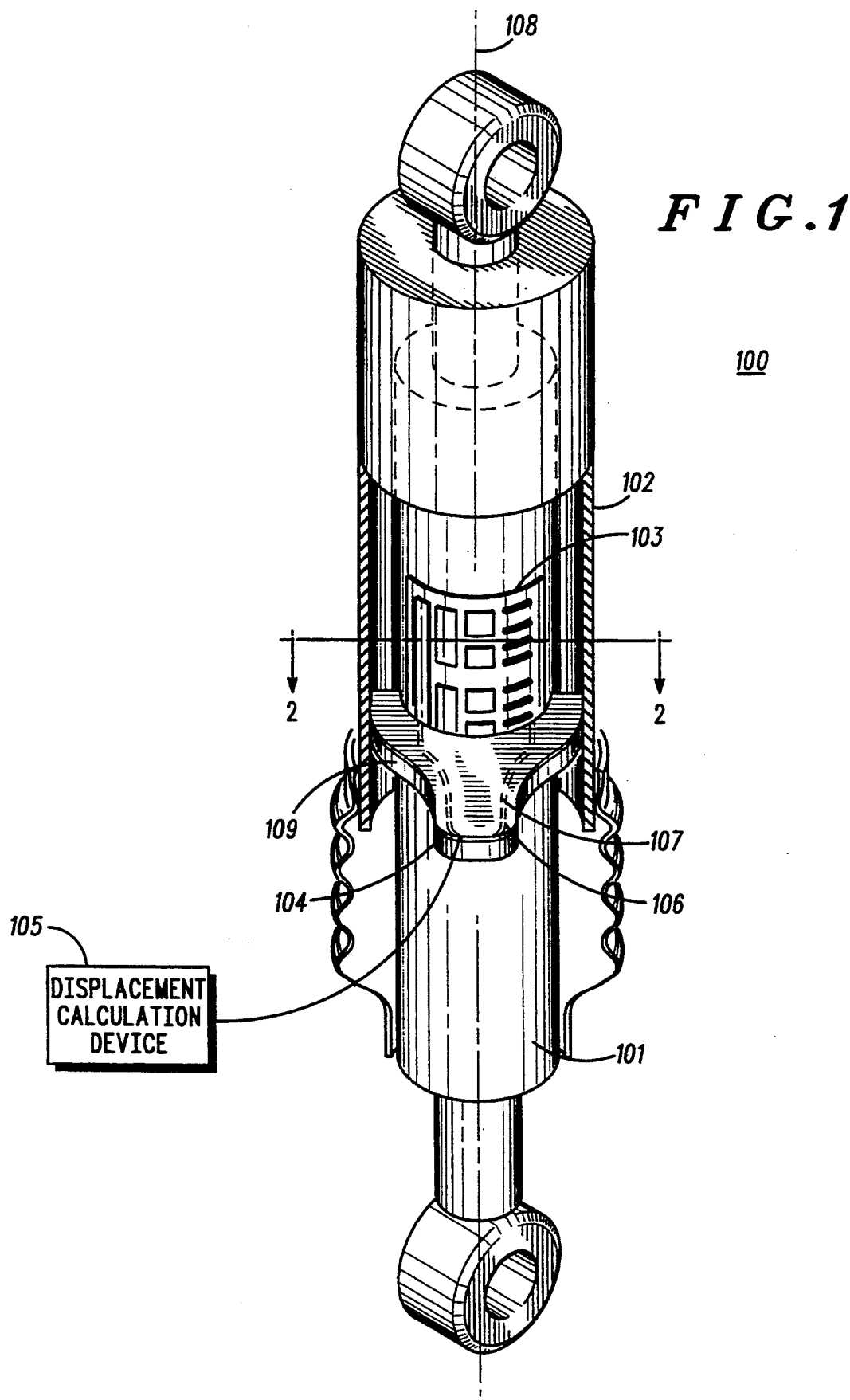
FIG. 1 illustrates a shock absorber and an optical sensor in accordance with the present invention.
Figure 2:
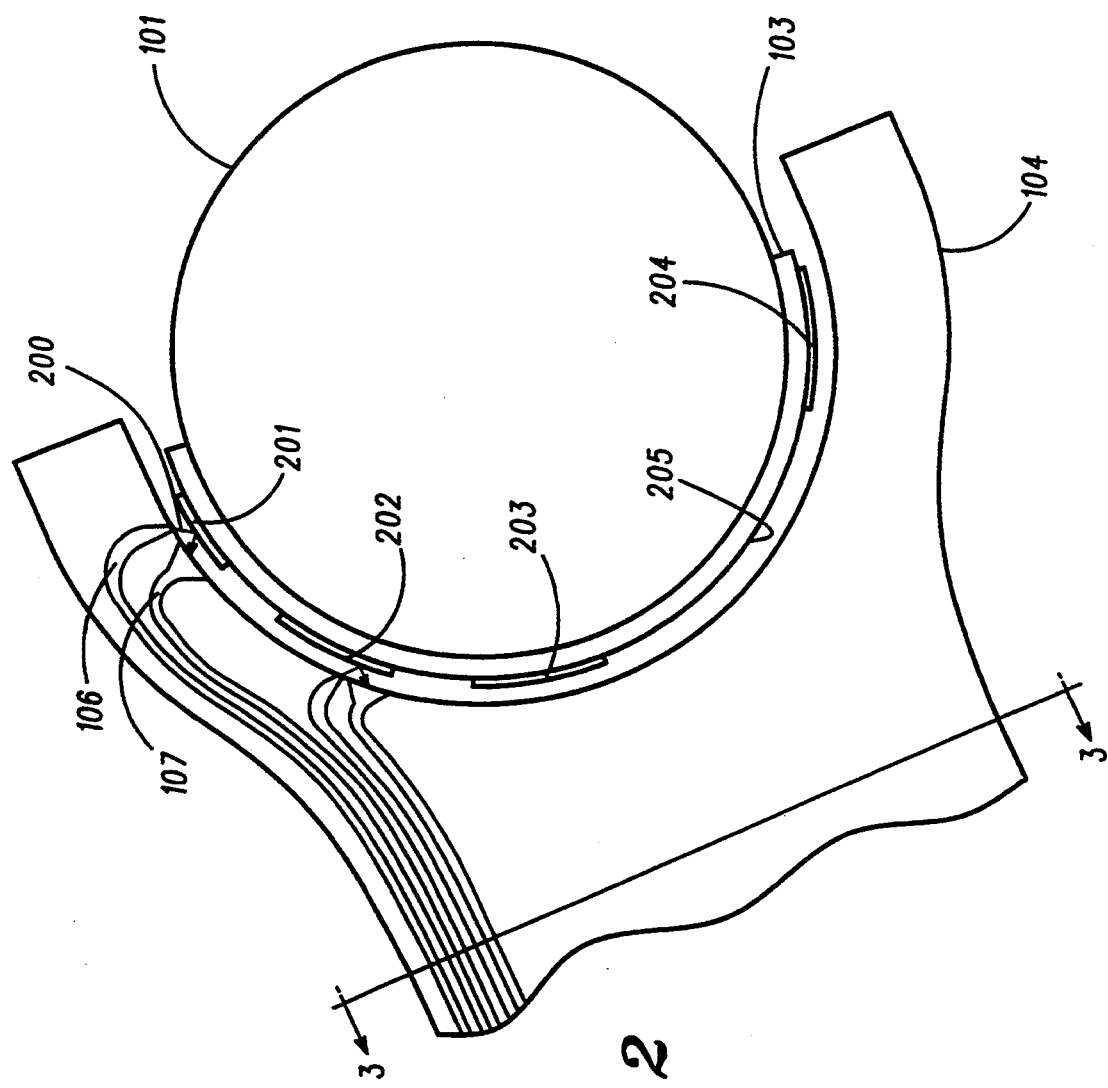
FIG. 2 illustrates a cross-sectional view of the shock absorber shown in FIG. 1.

The present invention can be more fully described with reference to FIGS. 1-3. FIG. 1 illustrates a shock absorber 100 that includes a first member 101, a second member 102, an optical code pattern 103, an optical transceptive means, or encircling optical sensor 104 with optical waveguides.

Preferably, the first member 101 has a longitudinal cylindrical shape. Also, preferably the optical code pattern 103 is comprised of a digitized pattern containing a plurality of tracks disposed along a portion of an outer surface of the first member 101. Each of the plurality of tracks includes a plurality of reflective portions interdigitated with a plurality of nonreflective portions.

The encircling optical sensor 104 includes optical waveguides comprising multiple light transmitting paths 106, and light receiving paths 107.

A displacement calculation device 105 is placed outside of the shock absorber. This displacement calculation device 105 contains electrical components used to determine the linear displacement between the first 101 and second 102 members. It is located outside of the shock absorber because the temperature is substantially lower and the electrical components will operate much more reliably at these lower temperatures.

As a vehicle, having the just-described apparatus traverses over a road, the two sections of the shock absorber, the first member 101, and the second member 102, will be linearly displaced relative to each other. Specifically, the first member 101 moves, while the second member 102 is fixed with respect to the vehicle. The linear displacement transpires parallel to a first axis 108.

For the purpose of providing a smooth ride, the displacement calculation device 105 is needed to determine the height of the vehicle, in this case the displacement between the first member 101 and the second member 102. Then, the displacement calculation device 105 sends a displacement signal to a suspension control system. The suspension control system calculates the absolute height provided by the displacement signal, and adjusts the vehicle height.

The shock absorber 100, with the above described linear displacement apparatus, can be assembled by the following steps. First, a thin sheet which contains an optical code pattern is either welded or adhesively bonded on the external surface of the first member 101.

Second, the encircling optical sensor 104 is adhesively attached on a sensor holder 109. Third, the sensor holder 109 is mechanically fixed on the inner surface of the second member 102. The light transmitting paths 106, and the light receiving paths 107 of the encircling optical sensor 104, are coupled to the displacement calculation device 105 via a fiber ribbon. Of course, other interconnect approaches may be used.

Then the first member 101 is mounted to a suspension control arm which is fixed to a wheel of the vehicle, while the second member 102 is firmly fixed to a body of the vehicle. Therefore, when the vehicle traverses over a road, the first member 101 moves up or down relative to the second member 102 along the first axis 108.

To measure the linear displacements, the encircling optical sensor 104 transmits light, via a curved light transmitting path 106, to the optical code pattern 103. Preferably, the optical code pattern 103 is comprised of a Gray code. Optionally other binary codes may be used. Then, the light is either reflected off, or absorbed by, the optical code pattern. If reflected, the light is collected by a curved light receiving path 107. A received signal state of logical "0" corresponds to no reflection, and a received signal state of logical "1" corresponds to a reflection. The remote displacement calculation device 105 both transmits the light and receives the light to and from the encircling optical sensor 104. FIG. 2 illustrates a cross-sectional view of the shock absorber 100, and the encircling optical sensor 104. As mentioned above, the light transmitting path 106 transmits light to the optical code pattern 103 which reflects or absorbs the transmitted light. Reference numbers 201,202, 203, and 204 illustrate various reflective sections of the optical code pattern 103. Reference number 205 illustrates a non-reflective, or absorptive section of the optical code pattern 103.

If the light is reflected off a reflective section, as shown by reference number 200, it is reflected to the light receiving path 107. To provide a sufficient quantity and focus of light transmitting onto the optical code pattern 103, the transmitting path 106 is fabricated into a shape such that it has a decreasing diameter facing the optical code pattern 103. A larger diameter on the opposing side of the transmitting path 106, ensures that higher percentage of light is coupled into the light transmitting path 106 from the displacement calculation device 105. A substantially tubular geometry or the light transmitting path 106 commences at a first cross-sectional area and progresses to a smaller cross-sectional area as is approaches the optical code pattern 103. Preferably, the diameter of the path light transmitting 106 is tapered down into less than 0.4 mm. This enables the light receiving path 107 to distinguish a series of 0.25 mm width reflective and non-reflective patterns comprising the optical code pattern 103. Interestingly, the light receiving path 107 is also formed of a waveguide having a substantially tubular geometry, terminated with a cup, or funnel shape to collect a large amount of reflected light off of the optical code pattern 103.

Figure 3:
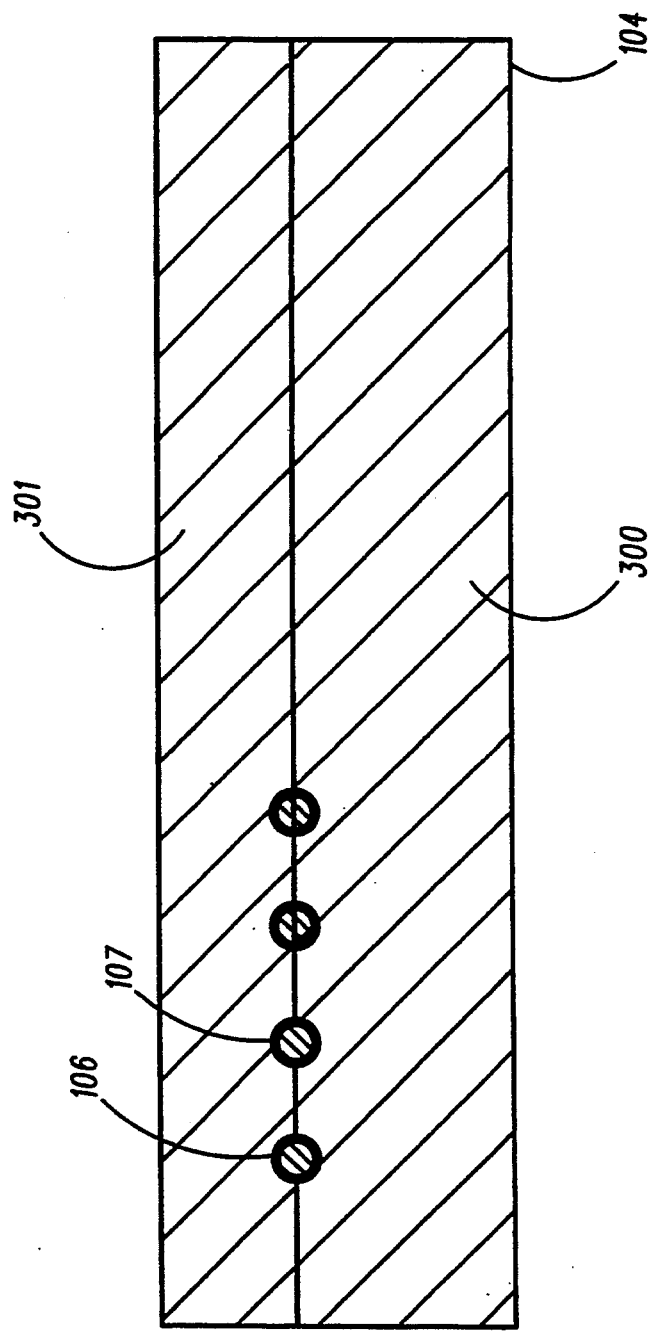
FIG. 3 illustrates a cross-sectional view of an encircling optical sensor in accordance with the present invention.

FIG. 3 illustrates a cross-sectional view of the encircling optical sensor 104. Several techniques can be applied to fabricate the encircling optical sensor 104. Inexpensive fabrication methods include injection molding, extruding, and stamping of plastics. Other methods include photolithography of photo-imagable polymers, chemical etching, reactive ion etching, and photosensitive polymers. The encircling optical sensor 104 is constructed of a horseshoe geometry. This enables it to be easily assembled into the shock absorber. The encircling optical sensor 104 includes the light transmitting path 106, the light receiving path 107, a substrate cover 301, and a substrate 300. The paths, 106 and 107 are located surrounded inside of 300 and 301 which together function as a substrate. Refractive indices of both paths 106 and 107 are higher than that of the substrate 300 and the substrate cover 301. This ensures that light propagates only inside of the paths 106 and 107 without optical crosstalk. Preferably, the paths 106 and 107 are essentially formed as a groove on the substrate filled with a material comprising a molded plastic material. For instance, a dielectric material such as fluorinated polysulphone which has a high refractive index. While the substrate 300 and the substrate cover 301 are composed of another polysulphone material with a lower refractive index. That both materials are made from the same base material is advantageous because they have a similar thermal coefficient of expansion. Optionally, conductive materials such as metal may be used to form the substrate 300 and the substrate cover 301 with hollow light paths 106 and 107. Alternatively, the paths 106 and 107 may be formed using a fiber-optic waveguide.

Notwithstanding the configuration shown in FIG. 3, various other transmitting and receiving paths can be implemented. For example, the transmitting and receiving paths 106 and 107 can be placed on alternative substrates and covers, as shown in FIGS. 4, 5, and 6.

Figure 4:
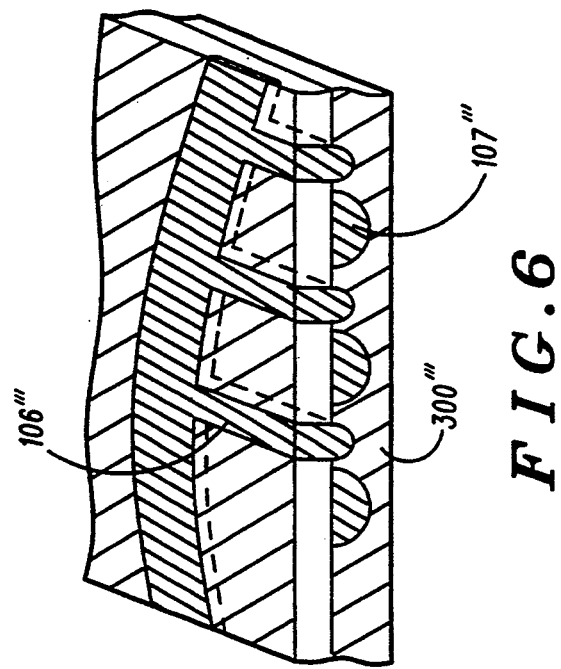
FIGS. 4, 5, and 6 illustrate cross-sectional view of alternative encircling optical sensors.

In FIG. 4, there is a singular light transmitting path 106' and multiple light receiving paths 107'. The cover 301' contains a single transmitting light emitted from the remote light source. The transmitted light is then split into multiple beams at the inner circle of the encircling optical sensor 104 to reflect off the code pattern 103. Rather than being reflected at the same level as the transmitting path 106', the reflected light is then guided down into the receiving paths 107' on the substrate level 300'. Advantages of two-layer configuration include that only one light source is needed. Second, the packaging size is reduced in the direction which is perpendicular to the first axis 108 without optical crosstalk.

Figure 5:
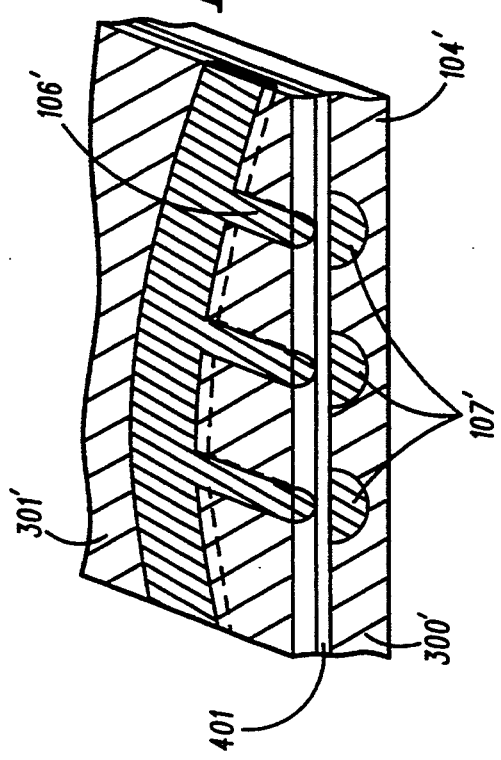

In FIG. 5 a top level transmitting path 106", which is parallel to the receiving paths 107" of the bottom layer, may be bent downward along the first axis direction 108 into the receiving path at only the output end. The transmitting path 106" can emerge into the receiving paths 107" to form "coaxial" path. This design yields a greater transmission efficiency while retaining the compactness of the design illustrated in FIG. 5.

Figure 6:
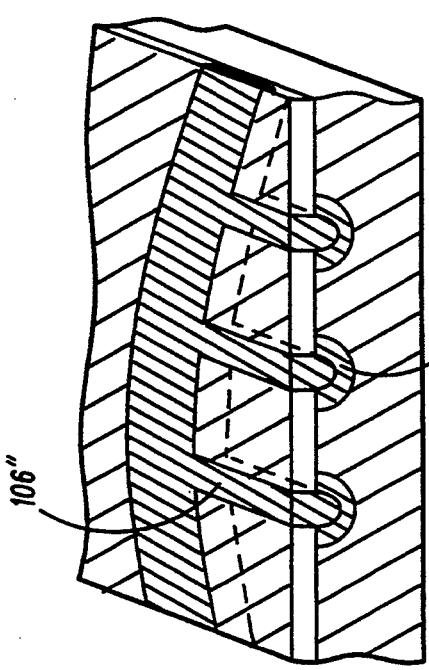

Optionally, as shown in FIG. 6 the transmitting path 106''' can be bent down and rotated certain angle around the first axis 108 so that the transmitting 106''' and receiving 107''' paths are placed next to each other on the same receiving path layer 300'''.

A system block diagram of the encircling optical sensor 104, and the displacement calculation device 105 is illustrated in FIG. 7. The encircling optical sensor 104, is a passive optical element, as described above. The encircling optical sensor 104 is located inside the shock absorber and operates in a high temperature environment. The displacement calculation device is located external to the shock absorber in a more benign temperature environment compatible with electrical components. Internal to the displacement calculation device 105 are a light source 701, and a group of 9 photodetectors 703. In the preferred embodiment, the light source is comprised of a light-emitting diode. In this case one of the encircling optical sensor designs shown in FIGS. 4, 5, or 6 would be employed. Optionally, 9 light-emitting diodes could drive the encircling optical sensor shown in FIG. 3. The photodetectors are comprised of photodiodes, that are responsive to the same spectrum emitted by the light-emitting diode. Also a Gray code converter 705 is employed to convert the light received from the light receiving paths 107, and detected by the photodetectors 703 to a binary output indicating linear displacement between the members 101 and 102 to an external control system. The external control system is not detailed here because of its conventional nature.

As mentioned before, to determine the displacement between the first member 101 and the second member 102, the optical code pattern 103 such as a nine-bit Gray code pattern, chosen to meet the required resolution for this application, is mounted to the first member 101. The need for the nine-bit Gray code pattern is detailed below. The Gray code is favorable in this case because it changes only one bit for one digit displacement. Since the beam size, transmitted from the transmitting path 106, is relatively small (less than 0.4 mm in diameter), the luminance intensity is usually low. To improve signal to noise ratio, contrast between reflective and non-reflective codes 201-209 of the optical code pattern 103 have to be maximized. For example, optical code pattern 103 can be constructed from an etched aluminum or stainless steel material, where the etched area, is the non-reflective area. This non-reflective area is filled with light absorbing material such as matte-finished black ink. The unetched area is reflective to provide good light reflection. Similarly, the optical code pattern 103 can be made by screen printed black and white epoxy or paint, by photo-sensitive polymers, and by Mylar film.

As a working example of the above, assume that the shock absorber 100 is mounted in a vehicle. The optical code pattern 103 is fixed around the first member 101 of the shock absorber 100. Since the maximum travel range between the first member 101 and the second member 102 is 100 mm, to achieve a 0.25 mm resolution a nine-bit Gray code pattern is used. This Gray code is constructed in the way that when the first member 101 and the second member 102 are in a fully compressed position, the corresponding Gray code is 000000000. This means that the light transmitted from the light transmitting path 106 will not be reflected to the light receiving paths 107, when the members 101 and 102 are in this fully compressed position. When the shaft is in a fully extended position, the corresponding Gray code is 100000000. This means that the light transmitted from the light transmitting path 106 will be reflected to one of the light receiving paths 107, when the members 101 and 102 are in this fully extended position. Returning to FIG. 7 the light source 701 transmits light via the light transmitting path 106, via the light transmitting path 106, off the Gray code encoded optical code pattern 103, via one or more of the light receiving paths 107, to the photodetectors 703. An output signal from the photodetectors 703 is sent to the Gray code converter 705, which produces a binary code representative of the linear displacement 707 of the first member 101 with respect to the second member 102.

The present invention provides a method and apparatus for sensing linear displacements between a first member 101 and a second member 102. The device described in the preferred embodiment is mass produceable at a low cost. Using injection molding, the encircling optical sensor 104 can be molded to different shapes depending on specific applications. Moreover, there is no restrictions on the size of the optical paths 106, and 107, since the paths can be custom designed to achieve a required accuracy. Furthermore, due to the robustness of this sensor, it can operate in a very harsh, high temperature, automotive environment.

What is claimed is:

1. A device for sensing linear displacements between a first member and a second member, wherein the first member has a non-planar geometric shape, wherein the second member has a substantially similar non-planar geometric shape as the first member, wherein, from a first axis, the second member substantially encompasses the first member, and wherein the sensed linear displacements are along a first axis, the device comprises:
   an optical code pattern disposed on a non-planar surface of the first member, wherein the optical code pattern at least partially encircles the first axis;
   an encircling optical sensor arranged on the second member, wherein the encircling optical sensor at least partially encircles the optical code pattern, wherein the encircling optical sensor senses the optical code pattern, and wherein the encircling optical sensor includes:
   at least one light transmitting path, wherein the at least one light transmitting path has a nonlinear geometry, and emits light on the optical code pattern to reflect off the optical code pattern to produce, at least a portion of the light off of the optical code pattern;
   a plurality of light receiving paths, wherein each of the plurality of light receiving paths has a nonlinear geometry, and wherein at least one of the light receiving paths receives the at least a portion of the light reflected off the optical code pattern emitted from the at least one light transmitting path; and
   a displacement calculation device, operably coupled to the encircling optical sensor, wherein the displacement calculation device calculates the displacement of the first member with respect to the second member.

2. A sensing device in accordance with claim 1 wherein the at least one light transmitting path comprises a fiber-optic waveguide.

3. A sensing device in accordance with claim 1 wherein each of the plurality of light receiving paths comprise fiber-optic waveguides.

4. A sensing device in accordance with claim 1 wherein the at least one light transmitting path and the plurality of light receiving paths are positioned on a common substrate.

5. A sensing device in accordance with claim 4 wherein each of the at least one light transmitting path and the plurality of light receiving paths are comprised of a first material and the common substrate is comprised of a second material, wherein the first and second materials have a different refractive index.

6. A sensing device in accordance with claim 5 wherein each of the at least one light transmitting path and the plurality of light receiving paths are formed by a groove on the substrate filled with a material comprising a molded plastic material.

7. A sensing device in accordance with claim 6 wherein the molded plastic material comprises a polysulphone plastic material.

8. A sensing device in accordance with claim 6 wherein the molded plastic material and the common substrate are formed with materials having substantially a same thermal coefficient of expansion.

9. A sensing device in accordance with claim 1 wherein said encircling optical sensor is constructed of a horseshoe geometry.

10. A sensing device in accordance with claim 1 wherein the optical code pattern comprises a Gray code.

11. A sensing device in accordance with claim 1 wherein each of the plurality of light receiving paths are formed of a substantially tubular geometry, wherein opposite the optical code pattern on the first member the substantially tubular geometry commences at a first cross-sectional area and progresses to a smaller cross-sectional area.

12. A sensing device in accordance with claim 1 wherein the device is mounted in a shock absorber.

13. A sensing device in accordance with claim 1 wherein the first member has a cylindrical shape.

14. A device for sensing linear displacements between a first member and a second member, wherein the first member has a non-planar geometric shape, wherein the second member has a substantially similar non-planar geometric shape as the first member, wherein, from a first axis, the second member substantially encompasses the first member, and wherein the sensed linear displacements are along a first axis, the device comprises:

an optical code pattern disposed on a non-planar surface of the first member, wherein the optical code pattern at least partially encircles the first axis;

an encircling optical sensor arranged on the second member, wherein the encircling optical sensor at least partially encircles the optical code pattern, wherein the encircling optical sensor senses the optical code pattern, and wherein the encircling optical sensor includes:

at least one light transmitting path, wherein the at least one light transmitting path has a nonlinear geometry, and wherein a termination of the at least one light transmitting path emits light on the optical code pattern to reflect, non-normal to the optical code pattern to produce, at least a portion of the light off of the optical code pattern, and wherein the termination has a smaller cross-sectional area than a cross-sectional area of the at least one light transmitting path;

a plurality of light receiving paths, wherein each of the plurality of light receiving paths has a nonlinear geometry, and wherein at least one of the light receiving paths receives the at least a portion of the light reflected off the optical code pattern emitted from the at least one light transmitting path; and a displacement calculation device, operably coupled to the encircling optical sensor, wherein the displacement calculation device calculates the displacement of the first member with respect to the second member dependent on the transmission of light from the at least one light transmitting path, including the optical code pattern to at least one of the plurality of light receiving paths.

15. A method for sensing linear displacements between a first member and a second member, wherein the first member has a non-planar geometric shape, wherein the second member has a substantially similar non-planar geometric shape as the first member, wherein, from a first axis, the second member substantially encompasses the first member, and wherein the linear displacements are along the first axis, the method comprises the steps of:

disposing an optical code pattern on a non-planar surface of the first member, wherein the optical code pattern at least partially encircles the first axis and has a substantially similar non-planar surface as the first member;

positioning an encircling optical sensor on the second member to at least partially encircle the optical code pattern;

transmitting, by the encircling optical sensor, a light beam onto the optical code pattern;

receiving, by the encircling optical sensor, a reflected portion of the light beam; and calculating the linear displacement of the first member with respect to the second member based on the reflected portion of the light.

16. A device for indicating an axial position of a shaft, the device comprising:

a coded longitudinal member principally oriented coincident with a first axis, said coded longitudinal member having a digitized pattern disposed thereon, wherein the digitized pattern comprises a plurality of tracks disposed along a portion of an outer surface of said coded longitudinal member, wherein the outer surface extends radially surrounding the first axis, wherein each of the plurality of tracks includes a plurality of reflective portions interdigitated with a plurality of non-reflective portions, the tracks extending along a portion of the outer surface longitudinally oriented with the first axis;

optical transceptive means oriented at least partially circumferentially surrounding said coded longitudinal member, said optical transceptive means including at least a light transmission path, and a plurality of light reception paths, wherein the plurality of light reception paths are positioned opposite the plurality of tracks such that a transception path is completed between the at least a light transmission path, the plurality of tracks of the digitized pattern, and the plurality of light reception paths; and a displacement calculation device, operably coupled to the optical transceptive means, wherein said displacement calculation device calculates the displacement of the optical transceptive means along said coded longitudinal member dependent on the transception of light between the at least a light transmission path, the plurality of tracks of the digitized pattern, and the plurality of light reception paths.

* * * * *